United States Patent
Paddock et al.

(10) Patent No.: US 9,764,826 B2
(45) Date of Patent: Sep. 19, 2017

(54) LANDING GEAR ASSEMBLY AND METHODS

(71) Applicant: Safran Landing Systems UK LTD, Gloucester, Gloucestershire (GB)

(72) Inventors: Andrew Paddock, Coleford (GB); Paul Empson, Gloucester (GB)

(73) Assignee: Safran Landing Systems UK LTD (GB)

( * ) Notice: Subject to any disclaimer, the term of this patent is extended or adjusted under 35 U.S.C. 154(b) by 88 days.

(21) Appl. No.: 14/647,586

(22) PCT Filed: Nov. 19, 2013

(86) PCT No.: PCT/GB2013/053044
§ 371 (c)(1),
(2) Date: May 27, 2015

(87) PCT Pub. No.: WO2014/083317
PCT Pub. Date: Jun. 5, 2014

(65) Prior Publication Data
US 2015/0314861 A1   Nov. 5, 2015

(30) Foreign Application Priority Data
Nov. 27, 2012   (GB) .................................. 1221253.6

(51) Int. Cl.
*B64C 25/26*   (2006.01)
(52) U.S. Cl.
CPC .................................... *B64C 25/26* (2013.01)
(58) Field of Classification Search
CPC ...................................................... B64C 25/26

USPC .......................................... 244/102 A, 102 R
See application file for complete search history.

(56) References Cited

U.S. PATENT DOCUMENTS

| 2,451,265 A | 10/1948 | Wescott |
| 2,507,962 A | 5/1950 | Clark |
| 2,534,962 A | 12/1950 | Flurscheim |
| 2,630,990 A | 3/1953 | Kanode |
| 2,661,171 A | 12/1953 | Allen |
| 2,668,030 A | 2/1954 | Smith |
| 2,690,887 A | 10/1954 | Perdue |

(Continued)

FOREIGN PATENT DOCUMENTS

| CN | 102712362 | 10/2012 |
| EP | 1988015 | 11/2008 |

(Continued)

OTHER PUBLICATIONS

Great Britain Search Report dated Mar. 27, 2013 for Great Britain Application No. GB1221253.6.

(Continued)

*Primary Examiner* — Timothy D Collins
*Assistant Examiner* — Keith L Dixon
(74) *Attorney, Agent, or Firm* — RatnerPrestia

(57) ABSTRACT

A landing gear assembly having a first part movable relative to a second part, and a spring coupled to the first and second parts via first and second anchor points. A lost motion assembly is provided to enable one of the anchor points to translate along one of the parts. As such, the spring extends less as the first part moves relative to the second part than it would if each anchor point was fixed to a respective part.

14 Claims, 3 Drawing Sheets

(56) References Cited

U.S. PATENT DOCUMENTS

| | | | |
|---|---|---|---|
| 2,720,369 A | 10/1955 | Detzer | |
| 2,896,884 A | 7/1959 | Perdue | |
| 3,038,687 A | 6/1962 | Hartel | |
| 3,042,345 A | 7/1962 | Holland | |
| 3,267,753 A | 8/1966 | Harper | |
| 3,589,649 A | 6/1971 | Leclercq | |
| 4,402,477 A * | 9/1983 | Turiot | B64C 25/34 244/102 R |
| 4,422,604 A * | 12/1983 | Turiot | B64C 25/34 244/102 R |
| 4,720,063 A | 1/1988 | James | |
| 5,022,609 A | 6/1991 | Cranston | |
| 5,269,481 A | 12/1993 | Derrien | |
| 6,345,787 B1 | 2/2002 | Tighe | |
| 6,786,451 B2 * | 9/2004 | Courtois | B64C 7/00 244/102 R |
| 7,234,664 B1 | 6/2007 | Anderson | |
| 7,967,245 B2 | 6/2011 | Seror-Goguet | |
| 8,038,096 B2 | 10/2011 | White | |
| 8,136,759 B2 | 3/2012 | Lavigne | |
| 9,145,204 B2 * | 9/2015 | Ducos | B64C 25/20 |
| 2009/0057485 A1 | 3/2009 | Seror-Goguet | |
| 2010/0181422 A1 | 7/2010 | Thompson | |
| 2011/0031348 A1 | 2/2011 | Thompson | |
| 2011/0163202 A1 | 7/2011 | Martinez | |
| 2011/0174924 A1 | 7/2011 | Ferraz | |

FOREIGN PATENT DOCUMENTS

| | | |
|---|---|---|
| EP | 2386487 | 11/2011 |
| GB | 464144 | 4/1937 |
| GB | 486936 | 6/1938 |
| GB | 531750 | 1/1941 |
| GB | 558751 | 1/1944 |
| GB | 567749 | 3/1945 |
| GB | 567750 | 3/1945 |
| GB | 579640 | 8/1946 |
| GB | 644147 | 10/1950 |
| GB | 704080 | 2/1954 |
| GB | 1390807 | 4/1975 |
| GB | 2474645 | 4/2011 |
| GB | 2494782 | 3/2013 |
| WO | 9407743 | 4/1994 |

OTHER PUBLICATIONS

International Search Report dated Feb. 26, 2014 for International Application No. PCT/GB2013/053044.
Written Opinion dated Feb. 26, 2014 for International Application No. PCT/GB2013/053044.
Chinese Office Action for Chinese Application No. 201380061997.5 with translation.

* cited by examiner

LANDING GEAR ASSEMBLY AND METHODS

This application is a U.S. National Phase application of PCT International Application No. PCT/GB2013/053044, filed Nov. 19, 2013, which claims the benefit of GB 1221253.6, filed Nov. 27, 2012, both of which are incorporated herein by reference.

BACKGROUND

An aircraft landing gear assembly is generally movable between a deployed condition, for take off and landing, and a stowed condition for flight.

An actuator may be provided for moving the landing gear assembly between the deployed and stowed conditions. This type of actuator is known in the art as a "retraction actuator". A retraction actuator may have one end coupled to the airframe and another end coupled to the main strut such that extension and retraction of the actuator results in movement of the main strut between deployed and stowed conditions.

One or more stay assemblies may be provided to support the orientation of the main strut when the landing gear assembly is in the deployed condition. A stay assembly generally includes a stay and a lock link arranged to maintain the stay in a condition which corresponds to the landing gear assembly being in the deployed condition. The lock link must be 'broken' to enable the stay to be folded, permitting the main strut to be moved by the retraction actuator towards the stowed condition.

It is common for landing gear assemblies to be arranged to move towards the deployed condition in the event of a failure of the retraction actuator. Initially the assembly will move by way of gravity and in doing so the landing gear assembly forces the stay to move towards the condition which corresponds to the landing gear assembly being in the deployed condition. One or more 'down locking' springs may be provided to assist in moving landing gear assembly to the deployed condition and locking it in that state by 'making' the lock link. Landing gear assemblies for larger aircraft may be provided with a pair of down locking springs on each stay assembly.

In order to meet down locking requirements on larger aircraft, such as those requiring four or six wheeled bogie beams on the main landing gear assembly (MLG), large down locking springs are required. In some cases this is due to the characteristics of a 'four point' attachment dual stay MLG, where the dual stays provide attachment points on the forward and aft sides of the landing gear to transfer drag and side loads into the airframe. Springs with a large wire diameter can however be undesirably heavy and can be difficult to manufacture.

SUMMARY

In accordance with a first aspect of the present invention, there is provided a landing gear assembly. The landing gear assembly may comprise a first elongate member and optionally a second elongate member movably coupled to the first elongate member. The landing gear assembly may comprise a spring pivotally coupled to the first elongate member via an anchor pin and movably coupled to the second elongate member via a lost motion assembly. The lost motion assembly may comprise a rod coupled to the second elongate member so as to move with the second elongate member. The lost motion assembly may comprise a shackle pivotally coupled to the spring and arranged to clasp the rod so as to be slidably coupled thereto. The lost motion assembly may comprise first and second end stops arranged to limit travel of the shackle along the rod, thereby defining respective first and second travel limit points on the longitudinal axis of the rod. The rod may be orientated relative to the second elongate member such that with the first elongate member at a first angular position with respect to the second elongate member, the distance between the first travel limit point and the anchor is less than the distance between the second travel limit point and the anchor. The rod may be orientated relative to the second elongate member such that with the first elongate member at a second angular position with respect to the second elongate member that is distinct to the first angular position, the distance between the first travel limit point and the anchor is greater than the distance between the second travel limit point and the anchor.

Thus, a landing gear assembly according to embodiments of the present invention incorporates lost motion into the down locking mechanism to reduce the amount of extension required by the down locking spring(s), as the landing gear assembly moves between deployed and stowed conditions, relative to an equivalent landing gear assembly in which both ends of the down locking spring(s) are coupled to fixed points. As such, smaller springs may be used.

The rod may extend generally parallel with respect to the portion of the surface of the second elongate member to which it is coupled.

The rod may be arranged such that its longitudinal axis is non-orthogonal with respect to the longitudinal axis of the second elongate member.

The longitudinal axis of the rod and longitudinal axis of the second member may be orientated at an angle of at least 10° with respect to one another. Thus, the angle may define the amount of stretch and hence load that is output from the down lock spring and also the point at which the lost motion is achieved during deployment of the gear. It is preferred that the angle is between about 10° and about 45°.

The shackle may extend at least half way around the rod, and preferably surrounds the rod. Thus, the shackle may securely clasp the rod.

The first angular position may be at least 5° from the second angular position.

The angular spacing between the first and second angular positions may be less than 120°.

The first angular position may correspond to the landing gear assembly being in, or close to, the deployed condition.

The second angular position may correspond to the landing gear assembly being in, or close to being in, the stowed condition.

The first member may be pivotally coupled to the second member.

The first member may comprise a stay arm. The second member may comprise a lock link.

The rod may be attached to the second elongate member by a pair of brackets that define the respective limit points.

The spring may comprise a down lock spring.

The thickness of the shackle may be at least 13 mm to enable use with large spring forces, such as spring forces in excess of 9000 N.

The end stops may comprise a stop face material arranged to absorb mechanical loads and impact forces of at least 5000 N and preferably between about 5000 N and about 15000 N.

It is preferred that the travel path i.e. the length of rod along which the shackle can travel in use is at least 50 mm to provide useful amount of lost motion; in some embodiments the travel path may be between about 25 mm and about 300 mm and preferably between about 50 mm and about 175 mm.

In accordance with a second aspect of the present invention, there is provided an aircraft including a landing gear assembly according to the first aspect.

In accordance with a third aspect of the present invention, there is provided a method of moving a landing gear between a retracted and a deployed condition.

Preferred features associated with the landing gear assembly according to the first aspect apply equally to the method according to the third aspect, mutatis mutandis.

BRIEF DESCRIPTION OF THE DRAWINGS

By way of example only, certain embodiments of the invention will now be described by reference to the accompanying drawings, in which.

DETAILED DESCRIPTION

As an overview, embodiments of the invention provide a landing gear assembly comprising a first part movable relative to a second part, and a spring coupled to the first and second parts via first and second anchor points. A lost motion assembly, which advantageously may be in the form of a rod and shackle assembly, is provided to enable one of the anchor points to translate along a finite path relative to one of the parts. The lost motion assembly results in less spring extension as the first part moves relative to the second part than would be the case if both anchor points were fixed to a respective part.

Figure 1:
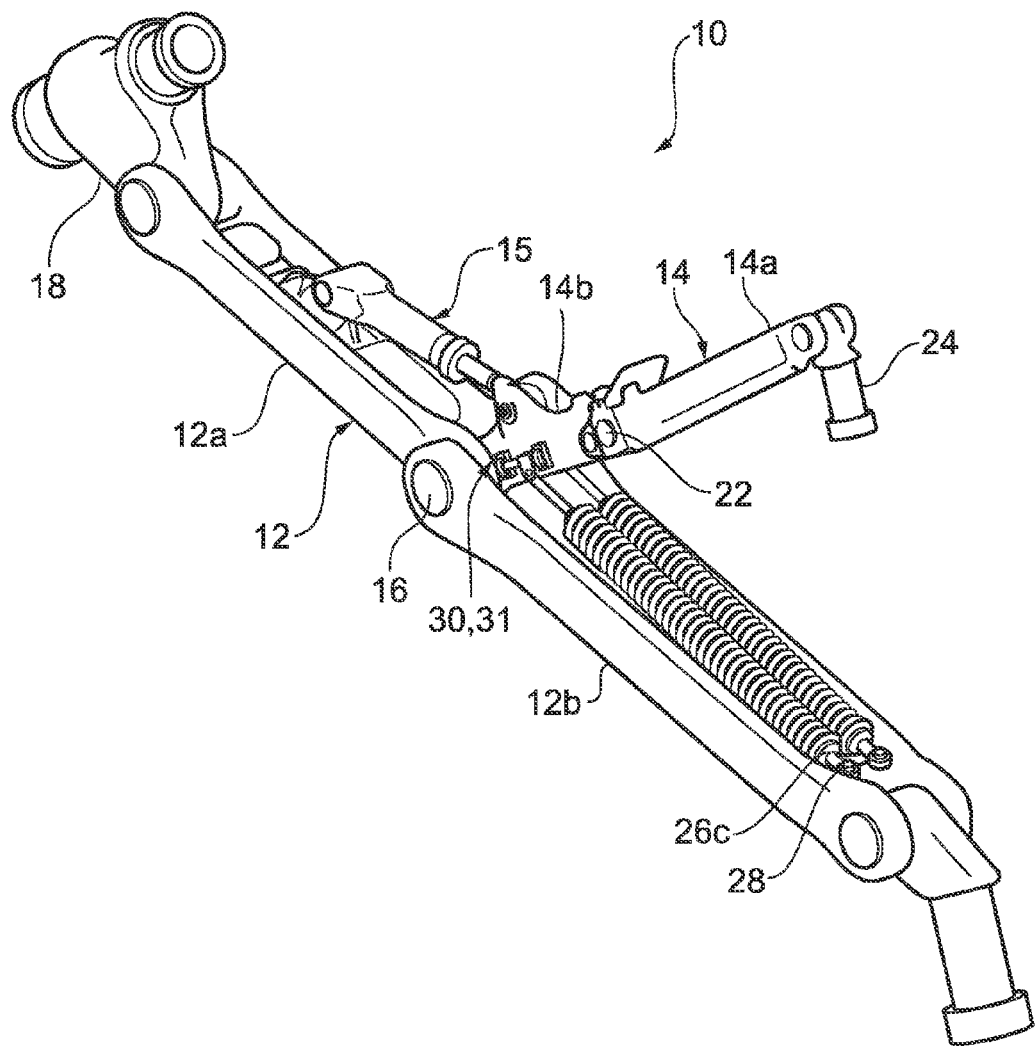
FIG. 1 is a diagram of a landing gear assembly according to an embodiment of the present invention in a generally deployed condition.

FIG. 1 shows a landing gear assembly 10 according to an embodiment of the present invention. The landing gear assembly 10 includes of a conventional foldable stay 12, a conventional lock link 14, and one or more convention down locking spring assemblies 26. In addition to these, the landing gear assembly 10 includes one or more rod and shackle assemblies 30, 31 configured to introduce lost motion into the down locking mechanism to reduce the amount of spring extension experienced by the down locking springs, relative to known landing gear assemblies, as the landing gear assembly folds.

The stay 12 is arranged to be moved between a folded condition, in which the landing gear assembly is stowed, and generally straight condition, in which the landing gear assembly is deployed.

The stay 12 has an elongate upper stay arm 12a having a lower end defining a pair of lugs pivotally coupled via a pivot pin 16 to a pair of lugs defined at an upper end of an elongate lower stay arm 12b. The stay arms 12a, 12b may therefore pivotally move relative to one another about the pivot pin 16. The upper end of the upper stay arm 12a defines a pair of lugs that are pivotally coupled to a lug of a connector 18 which in turn is pivotally coupled to the airframe (not shown). The lower end of the lower stay arm 12b defines a pair of lugs that are pivotally coupled to a lug of a connector 20 which in turn is pivotally coupled to the main strut (not shown).

The lock link 14 has an elongate upper link arm 14a having a lower end pivotally coupled to an upper end of an elongate lower link arm 14b via a pivot pin 22. The link arms 14a, 14b may therefore pivotally move relative to one another about the pivot pin 22. An upper end of the upper link arm 14a defines a pair of lugs that are pivotally coupled to a lug of a connector 24 which in turn is pivotally coupled to the main strut. A lower end of the lower link arm 14b defines a lug that is pivotally coupled to lugs of the stay arms 12a, 12b via the pivot pin 16. Lugs of upper stay arm 12a are disposed between the lugs of the lower stay arm 12b and the lugs of the lower link arm 14b. A lock stay actuator 15 is coupled between the upper stay arm 12a and lower link arm 14b and arranged to pivotally move the link arms 14a, 14b so as to 'lock' and 'unlock' the lock link 14. As will be appreciated, when the lock link is in the locked condition, as illustrated in FIG. 1, the upper and lower arms 14a, 14b are generally longitudinally aligned or coaxial, or may in some cases be 'over-centre', such that the lock link 14 is arranged to oppose a force attempting to fold the stay 12, so as to move the landing gear assembly from the deployed condition towards the stowed condition. When in the unlocked condition, the link arms 14a, 14b are not aligned, meaning that folding of the stay 12 results in folding the lock link 14. Thus, when in the unlocked condition, a retraction actuator (not shown) coupled between to the main strut and the airframe can move the landing gear assembly between the deployed and stowed conditions.

Figure 3:
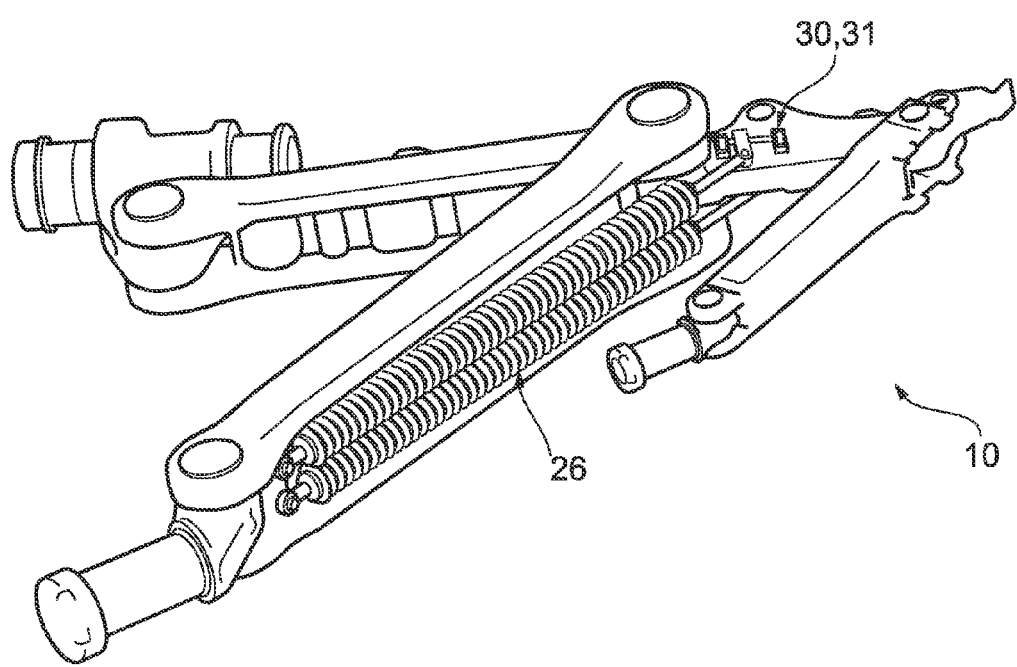
FIG. 3 is a diagram focusing of the landing gear assembly of FIG. 1 in a generally stowed condition.

The spring assemblies 26, 26' have similar configurations and as such, for brevity, only one will be described. The coil spring of the spring assembly 26 is at it shortest when the landing gear assembly is in the deployed condition, as shown in FIG. 1, and at its longest when the landing gear assembly approaches the stowed condition, as shown in FIG. 3. As the landing gear assembly is retracted towards the stowed condition, the spring of each spring assembly extends, resulting in increased spring load and torsional stress.

In order to keep spring stress below acceptable limits, prior art landing gear assemblies may be provided with springs having large wire and coil diameters; for example, a wire diameter in excess of 14 mm and a coil outer diameter in excess of 80 mm. However, the landing gear assembly 10 of embodiments of the present invention introduces lost motion into the down locking spring mechanism to enable a smaller spring to be used in comparison to the prior art.

Figure 2:
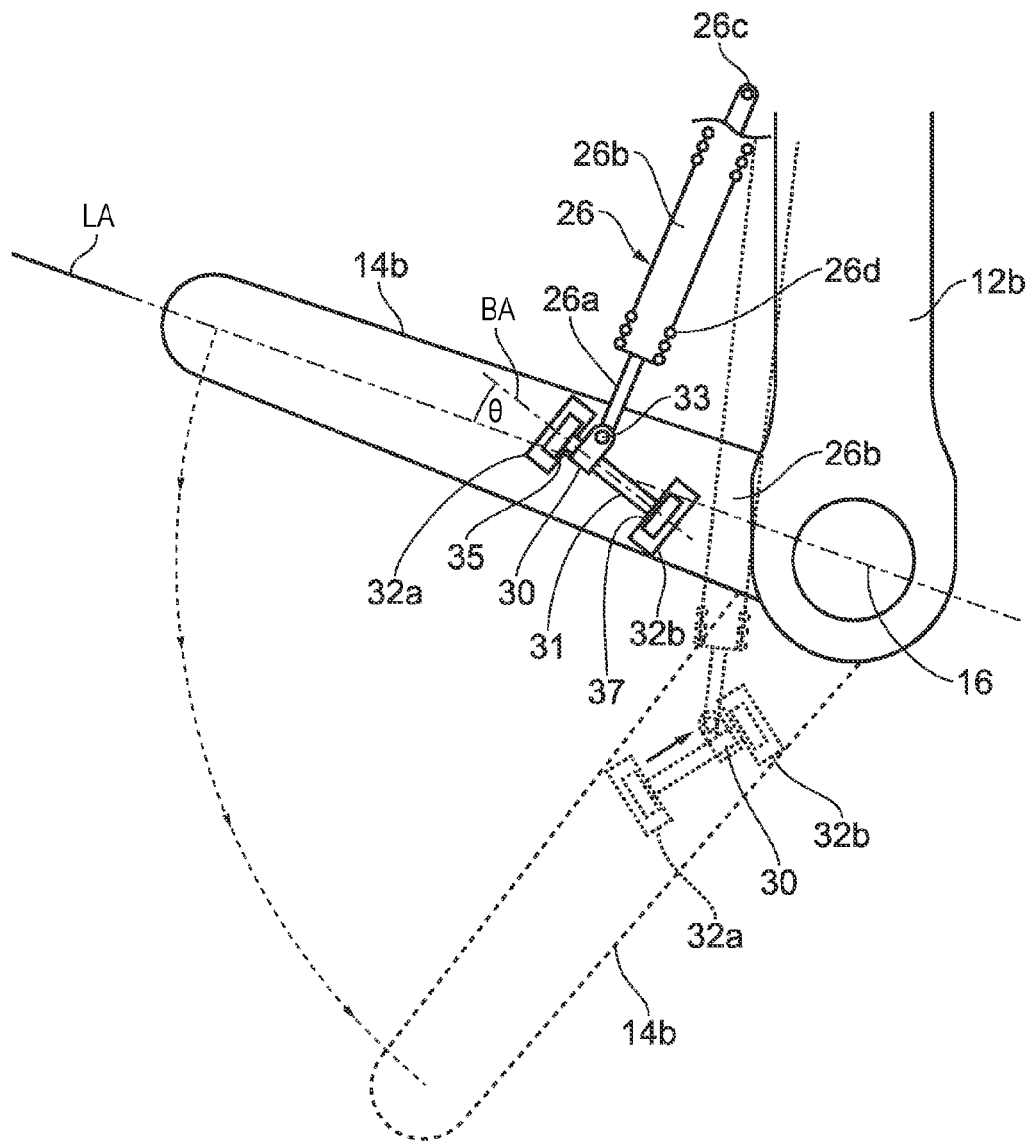
FIG. 2 is a diagram focusing on the lost motion down locking mechanism of the landing gear assembly of FIG. 1.

Referring additionally to FIG. 2, the spring assembly 26 has an upper end slidably coupled to the lower link arm 14b via a lost motion mechanism defined by a rod and shackle assembly 30, 31, and a lower end coupled to the lower stay arm 12b via a lower connector 28 at a location close to the connector 20. The spring assembly 26 is arranged to bias the lock link 14 towards the locked condition by way of spring tension. The spring assembly 26 includes an elongate upper spring anchor element 26a, an upper end of which is pivotally coupled to the shackle 30 via a pin joint 33, and a lower end of which defines a helical engagement formation 26d that is attached to a proximal end of the spring 26b. The pin joint 33, along with the other components of the rod and shackle assembly 30, 31, should be selected to be strong enough to cope with the spring forces provided by the down lock spring(s). A distal end of the spring 26b is coupled to the lower stay arm 12b via a lower engagement formation 26c which in turn is coupled to an anchor point defined by the lower connector 28.

The shackle 30 is slidably coupled to rod 31. The shackle 30 extends circumferentially around the rod 31 so as to envelop it, but may in other embodiments clasp the rod 31 in any suitable manner. The length of the shackle 30 i.e. the dimension extending parallel to its bore axis is preferably at least 30 mm to provide a large bearing surface. It is preferred that the thickness of the shackle 30 is at least 13 mm to enable use with large spring forces, such as spring forces in excess of 9000 N. The shackle 30 according to embodiments of the present invention may be formed of any suitable material, such as metal, carbon composite, or a hard plastics material; a preferred material for the shackle is corrosion resistant steel.

The rod 31 of the illustrated embodiment defines a generally linear pathway along which the shackle 30 can translate, although in other embodiments the rod may define a non-linear pathway. The rod 31 is attached to the lower lock arm 14b by a pair of brackets 32a, 32b mounted at the ends of the rod 31 and arranged to inhibit axial, pitch or yaw movement of the rod 31. Thus, the rod 31 is generally positionally fixed with respect to the lower lock arm 14b. Although brackets 32a, 32b are provided, the rod 31 may be positionally fixed with respect to the lock arm 14b by any suitable means.

The brackets 32a, 32b of the illustrated embodiment also define a pair of opposing faces 35, 37 which serve as end stops arranged to limit travel of the shackle 30 along the rod 31. Each end stop defines a point on the longitudinal axis BA of the rod 31 beyond which the shackle 30 is inhibit from moving. These points will be referred to as "limit points". The shackle 30 is disposed on the rod 31 between the limit points. The end stops in embodiments of the invention may take any suitable form in which they limit bi-directional travel of the shackle 30 along the rod 31, thereby defining respective first and second travel limit points on the longitudinal axis BA of the rod 31 to inhibit the shackle 30 disengaging the rod 31. The end stops 35, 37 preferably comprise a stop face material arranged to absorb mechanical loads and impact forces of at least 5000 N and preferably between about 5000 N and about 15000 N.

The rod 31 according to embodiments of the present invention may have any suitable length and thickness; for example, a length between 100 mm and 200 mm and diameter of between 10 mm and 20 mm. The rod 31 preferably has a rounded, for example circular, cross section. The rod 31 may be hollow or solid. It is preferred that the travel path i.e. the length of rod 31 along which the shackle 30 can travel in use is at least 50 mm to provide useful amount of lost motion; in some embodiments the travel path may be between about 25 mm and about 300 mm and preferably between about 50 mm and about 175 mm.

The rod 31, brackets 32a, 32b and/or end stops according to embodiments of the present invention may be formed of any suitable material, such as metal, carbon composite, or a hard plastics material; a preferred material for one or more of these parts is corrosion resistant steel.

With the landing gear assembly in the deployed condition, the distance between the first limit point, define by the first end stop 35, and the centre point of the lower connector 28 is less than the distance between the second limit point, define by the second end stop 37, and the centre point of the lower connector 28. Thus, in this condition, the shackle 30 abuts the first end stop 35 due to spring tension, as shown in FIG. 1.

As the landing gear assembly moves towards the stowed condition, which is illustrated by the dashed lines in FIG. 2, the lower link arm 14b pivots about pin 16 so as to increase the angle between itself and the lower stay arm 12b. The first and second limit points each move in an arc. This increases the distances between the limit points, one the one hand, and the centre point of the lower connector 28 on the other hand, but by different amounts. The second limit point moves a shorter distance from centre point of the lower connector 28 than the first limit point does. As the lower link arm 14b continues to move away from the locked condition, the rod 31 assumes a balance point in which the first and second limit points are equidistant from the centre point of the lower connector 28. Continued movement of the lower link arm 14b away from the locked condition changes the balance of the rod 31 such that the second limit point is closer to the lower connector 28 than the first limit point is to lower connector 28. Due to this, as the lower link arm 14b pivots about pin 16, the shackle 30 linearly transposes along the rod 31 to abut the second end stop 37 and as such the degree of extension required by spring 26b is reduced in comparison with an arrangement in which the spring 26 is attached directly to a pivot pin on the lower lock arm 14b.

The lock link 14 geometry, which governs the degree of spring extension, may be arranged to provide optimum mechanical advantage close to the landing gear assembly deployed condition; for example, when the main strut is between 5° retracted and fully deployed. As will be appreciated by the skilled person, the optimum mechanical advantage may be reached by utilising the maximum loads within the maximum allowable stress limits of the spring. This may be developed by changing the moment arm distance between the shackle travel extremities on the one hand and the axis of rotation of the pivot pin 16 on the other hand.

In the illustrated embodiment, the rod 31 is orientated such that its longitudinal axis BA is non parallel with respect to the longitudinal axis LA of the lower lock arm 14b to as to define an angle σ between them. The angle σ may define the amount of stretch and hence load that is output from the down lock spring and also the point at which the lost motion is achieved during deployment of the gear. It is preferred that the angle σ is between about 10° and about 45°.

Thus, the amount of lost motion provided by embodiments of the present invention can be determined by the length of the rod 31 travel path and the angle σ of the rod with respect to the lower lock arm 14b.

Embodiments of the invention may include any suitable rod and shackle assembly. The rod and shackle assembly may be incorporated in the spring coupling between any two parts of a landing gear assembly. In some embodiments, the rod and shackle mechanism may be incorporated in the spring coupling between any two parts of an apparatus.

The landing gear assembly according to embodiments of the invention may be incorporated in any landing gear which employs down locking springs to assist in the safe deployment and locked down position of the gear.

The present inventors have identified that a rod and shackle arrangement is a particularly advantageous way of implementing lost motion into the down locking assembly. For example, the spring 26b may be coupled to the shackle 30 and the shackle 30 coupled to the rod 31 via pin joints, allowing the bearing areas to be larger than "line contact" joints such as pin and slot joints, thereby enabling the use of larger spring forces. Moreover, embodiments of the present invention may provide a simple way of achieving lost motion due to the use of only two joints in the lock motion mechanism i.e. the pin joint 33 and the rod/shackle joint 31, 30; this my improve safety and increase ease of maintenance. Moreover, embodiments of the present invention result in the spring constantly being engaged, enabling a constant extension force to be exerted and reducing the likelihood of jamming. The use of a rod 31 and shackle 30 in embodiments of the present invention may also provide a robust mechanism that is less sensitive to manufacturing tolerances than other types of joints.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The word "coupled" can mean "attached" or "connected". The singular reference of an element does not exclude the plural reference of such elements and vice-versa. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A landing gear assembly comprising:
   a first elongate member;
   a second elongate member movably coupled to the first elongate member; and
   a spring coupled to the first elongate member via an anchor at a first end region of the spring, and movably coupled to the second elongate member via a lost motion assembly at a second end region of the spring, the lost motion assembly comprising:
      a rod coupled to the second elongate member so as to move with the second elongate member;
      a shackle connected between the spring and the rod and arranged to clasp the rod so as to be slidably coupled thereto; and
      first and second end stops arranged to limit travel of the shackle along the rod, thereby defining respective first and second travel limit points on a longitudinal axis of the rod,
   wherein the lost motion assembly is arranged such that:
      with the first elongate member at a first angular position with respect to the second elongate member, the distance between the first travel limit point and the anchor is less than the distance between the second travel limit point and the anchor; and
      with the first elongate member at a second angular position with respect to the second elongate member that is distinct from the first angular position, the distance between the first travel limit point and the anchor is greater than the distance between the second travel limit point and the anchor.

2. A landing gear assembly according to claim 1, wherein the rod extends generally parallel with respect to the portion of the surface of the second elongate member to which it is coupled.

3. A landing gear according to claim 1, wherein the rod is arranged such that its longitudinal axis is non-orthogonal with respect to the longitudinal axis of the second elongate member.

4. A landing gear assembly according to claim 1, wherein the longitudinal axis of the rod and longitudinal axis of the second member are orientated at an angle of at least 10 degrees with respect to one another.

5. A landing gear assembly according to claim 1, wherein the shackle surrounds the rod.

6. A landing gear assembly according to claim 1, wherein the first angular position is at least 5 degrees from the second angular position.

7. A landing gear assembly according to claim 1, wherein angular spacing between the first and second angular positions is less than 120 degrees.

8. A landing gear assembly according to claim 1, wherein the first angular position corresponds to the landing gear assembly being in, or close to, the deployed condition.

9. A landing gear assembly according to claim 1, wherein the second angular position corresponds to the landing gear assembly being in, or close to being in, the stowed condition.

10. A landing gear assembly according to claim 1, wherein the first member comprises a stay arm and the second member comprises a lock link.

11. A landing gear assembly according to claim 1, wherein the rod is attached to the second elongate member by a pair of brackets that define the respective limit points.

12. A landing gear assembly according to claim 1, wherein the spring comprises a down lock spring.

13. An aircraft including a landing gear assembly according to claim 1.

14. A method of moving a landing gear assembly between a retracted condition and a deployed condition, the method comprising:
   moving a first elongate member relative to a second elongate member to which the first elongate member is coupled, said movement changing the extension state of a spring that is coupled to the first elongate member via an anchor at a first end region of the spring, and that is movably coupled to the second elongate member via a lost motion assembly at a second end region of the spring, the lost motion assembly comprising:
      a rod coupled to the second elongate member so as to move with the second elongate member;
      a shackle connected between the spring and the rod and arranged to clasp the rod so as to be slidably coupled thereto; and
      first and second end stops arranged to limit travel of the shackle along the rod, thereby defining respective first and second travel limit points on the longitudinal axis of the rod,
   whereby said movement changes the orientation of the rod relative to the second elongate member such that:
      with the first elongate member at a first angular position with respect to the second elongate member, the distance between the first travel limit point and the anchor is less than the distance between the second travel limit point and the anchor; and
      with the first elongate member at a second angular position with respect to the second elongate member that is distinct from the first angular position, the distance between the first travel limit point and the anchor is greater than the distance between the second travel limit point and the anchor.

* * * * *